(12) United States Patent
Hokuto

(10) Patent No.: US 9,297,322 B2
(45) Date of Patent: Mar. 29, 2016

(54) CONTROL DEVICE FOR INTERNAL COMBUSTION ENGINE

(75) Inventor: Hiroyuki Hokuto, Numazu (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 15 days.

(21) Appl. No.: 14/364,151

(22) PCT Filed: Dec. 14, 2011

(86) PCT No.: PCT/JP2011/078912
§ 371 (c)(1),
(2), (4) Date: Jun. 10, 2014

(87) PCT Pub. No.: WO2013/088525
PCT Pub. Date: Jun. 20, 2013

(65) Prior Publication Data
US 2014/0360463 A1    Dec. 11, 2014

(51) Int. Cl.
*F01M 11/00* (2006.01)
*F02D 41/14* (2006.01)
(Continued)

(52) U.S. Cl.
CPC ........... *F02D 41/04* (2013.01); *F01M 11/0004* (2013.01); *F01M 11/10* (2013.01); *F02D 41/047* (2013.01); *F02D 41/1495* (2013.01);
(Continued)

(58) Field of Classification Search
CPC ..... F02D 41/04; F02D 41/22; F02D 2250/11; F02D 2041/224; F02D 41/047; F02D 41/1495; F02D 41/2454; F02D 2250/08; F01M 11/0004; F01M 2011/0037; F01M 11/08; F01M 2011/0045; F01M 2011/0033

USPC ......... 123/509, 510, 511, 515, 522, 523, 344, 123/701, 196 R, 196 A, 196 CP, 196 M; 184/6.22, 6.4, 7.4, 6.1; 701/109
See application file for complete search history.

(56) References Cited

U.S. PATENT DOCUMENTS

| | | | | |
|---|---|---|---|---|
| 4,134,380 | A * | 1/1979 | Niwa | F01M 5/005 123/142.5 E |
| 7,654,241 | B2 * | 2/2010 | Kobayashi | F01M 5/001 123/195 C |

(Continued)

FOREIGN PATENT DOCUMENTS

| | | |
|---|---|---|
| JP | 60128917 A | 7/1985 |
| JP | 2006-200366 A | 8/2006 |

(Continued)

*Primary Examiner* — Lindsay Low
*Assistant Examiner* — George Jin
(74) *Attorney, Agent, or Firm* — Kenyon & Kenyon LLP

(57) ABSTRACT

A control device of an internal combustion engine performs an air-fuel ratio feedback control to set an air-fuel ratio to a target air-fuel ratio, and determines abnormality of a fuel system based on a feedback correction amount by the air-fuel ratio feedback control. The control device of an internal combustion engine includes: a double tank type oil pan including: an inner tank and an outer tank for storing oil; and a mechanism which switches between connection and disconnection of the inner tank and the outer tank; and a controller configured to control the mechanism to connect the inner tank and the outer tank in a case where the feedback correction amount is equal to or larger than a first predetermined value. Thus, it is possible to prevent the air-fuel ratio from getting rich, and it is possible to appropriately prevent the erroneous determination of abnormality of the fuel system.

5 Claims, 2 Drawing Sheets

(51) Int. Cl.
*F02D 41/04* (2006.01)
*F02D 41/22* (2006.01)
*F01M 11/10* (2006.01)
*F02D 41/24* (2006.01)

(52) U.S. Cl.
CPC ........ F02D41/22 (2013.01); *F01M 2011/0037* (2013.01); *F01M 2011/0045* (2013.01); *F02D 41/2454* (2013.01); *F02D 2041/224* (2013.01); *F02D 2250/11* (2013.01); *Y02T 10/40* (2013.01)

(56) References Cited

U.S. PATENT DOCUMENTS

| | | | |
|---|---|---|---|
| 7,946,388 B2 * | 5/2011 | Kobayashi et al. | 184/6.4 |
| 2004/0099252 A1 * | 5/2004 | Nagaishi et al. | 123/480 |
| 2006/0137668 A1 * | 6/2006 | Honda et al. | 123/674 |
| 2007/0246000 A1 * | 10/2007 | Takemoto | F01M 1/04 123/196 R |
| 2008/0083586 A1 * | 4/2008 | Kobayashi | F01M 5/02 184/6.4 |
| 2009/0277416 A1 * | 11/2009 | Saito | F01M 11/0004 123/196 AB |
| 2015/0204263 A1 * | 7/2015 | DeAngelis | F02D 41/40 123/478 |

FOREIGN PATENT DOCUMENTS

| | | | |
|---|---|---|---|
| JP | 2008-267196 A | | 11/2008 |
| JP | 2009108689 A | | 5/2009 |
| JP | 2009162166 A | * | 7/2009 |
| JP | 2009216040 A | * | 9/2009 |
| WO | 2006/077996 A2 | | 7/2006 |

* cited by examiner

CONTROL DEVICE FOR INTERNAL COMBUSTION ENGINE

CROSS-REFERENCE TO RELATED APPLICATIONS

This is a national phase application based on the PCT International Patent Application No. PCT/JP2011/078912 filed on Dec. 14, 2011, the entire contents of which are incorporated herein by reference.

TECHNICAL FIELD

The present invention relates to a technical field of an internal combustion engine having a double tank type oil pan.

BACKGROUND TECHNIQUE conventionally, there is proposed an internal combustion engine having a double tank type oil pan. For example, Patent Reference 1 discloses a system including an oil communication path enabling bidirectional oil flow between an inner tank (a first tank) and an outer tank (a second tank), and a valve mechanism provided on the oil communication path. Specifically, Patent Reference 1 discloses that the communication between the inner tank and the outer tank is cut off by the operation of the valve mechanism in a case where the temperature of the oil in the inner tank is lower than a predetermined valve-opening temperature.

Further, Patent Reference 2 discloses a technique relevant to the present invention.

PRIOR ART REFERENCE

Patent Reference

Patent Reference 1: Japanese Patent Application Laid-open under No. 2006-200366
Patent Reference 2: Japanese Patent Application Laid-open under No. 2008-267196

DISCLOSURE OF INVENTION

Problem to be Solved by the Invention

By the way, as a problem for an internal combustion engine performing a cylinder injection, there is known a "fuel dilution" indicating that fuel mixes in the oil (meaning engine oil, the same applies hereinafter). When the fuel dilution occurs, the fuel mixed in the oil may be volatilized to be recirculated to the intake system and the air-fuel ratio may become rich. Thus, the feedback correction amount by the air-fuel feedback control becomes large, and the abnormality determination of the fuel system performed based on the feedback correction amount erroneously determines that abnormality is occurring in the fuel system. Patent Reference 1 and 2 mentioned above do not disclose such a defect and solution thereof.

The present invention is made to solve the above-described problem, and its object is to provide a control device for an internal combustion engine capable of appropriately preventing an erroneous determination of the fuel system abnormality caused by the fuel dilution, in the internal combustion engine having a double tank type oil pan.

Means for Solving the Problem

According to one aspect of the present invention, there is provided a control device for an internal combustion engine, which performs air-fuel ratio feedback control to set an air-fuel ratio to a target air-fuel ratio, and which determines abnormality of a fuel system based on a feedback correction amount by the air-fuel ratio feedback control, comprising: a double tank type oil pan including: an inner tank and an outer tank for storing oil; and a mechanism which switches between connection and disconnection of the inner tank and the outer tank; and a controller configured to control the mechanism to connect the inner tank and the outer tank in a case where the feedback correction amount is equal to or larger than a first predetermined value.

The above control device of an internal combustion engine is preferably applied to an internal combustion engine having a double tank type oil pan. The control device for an internal combustion engine performs air-fuel ratio feedback control to set an air-fuel ratio to a target air-fuel ratio, and determines abnormality of a fuel system based on a feedback correction amount by the air-fuel ratio feedback control. The double tank type oil pan includes an inner tank and an outer tank for storing oil, and a mechanism (e.g., a valve) which switches between connection and disconnection of the inner tank and the outer tank. The controller controls the mechanism to connect the inner tank and the outer tank in a case where the feedback correction amount is equal to or larger than a first predetermined value.

By connecting the inner tank and the outer tank, in comparison with the case where only the inner tank is used, the oil amount being used increases, and the dilution ratio defined by "Fuel amount/Oil amount" decreases. Namely, the fuel in the oil is diluted. Thus, the amount of the fuel mixed in the oil, volatilized and then recirculated to the intake system can be reduced, thereby preventing the air-fuel ratio from getting rich. As a result, since the feedback correction amount (absolute value) in the air-fuel ratio feedback control decreases, the feedback correction amount (absolute value) can be apart from the threshold value for determining abnormality in the fuel system, and it is possible to appropriately prevent an erroneous determination of abnormality occurring in the fuel system.

In one mode of the above control device for an internal combustion engine, the controller connects the inner tank and the outer tank in a case where a dilution amount indicating a fuel amount mixed in the oil in a current trip is larger than the dilution amount in a last trip preceding a starting time of the internal combustion engine of the current trip, if the feedback correction amount is equal to or larger than the first predetermined value.

In this mode, the controller connects the inner tank and the outer tank in a case where the feedback correction amount is equal to or larger than the first predetermined value and a dilution amount (meaning a fuel amount mixed in the oil. The same applies hereinafter.) in a current trip is larger than the dilution amount in a last trip (a trip preceding a starting time of the internal combustion engine of the current trip, i.e., meaning the trip just before the current trip. The same applies hereinafter.). By this, in a situation where the air-fuel ratio is getting rich due to the diluted fuel, it is possible to appropriately perform the control of connecting the inner tank and the outer tank. Therefore, it is possible to effectively prevent the erroneous determination of abnormality occurring in the fuel system.

In the above control device for an internal combustion engine, the controller may decrease a dilution ratio, which is a ratio of the fuel mixed in the oil to an amount of the oil, by connecting the inner tank and the outer tank.

In another mode of the above control device for an internal combustion engine, the controller controls the mechanism to connect the inner tank and the outer tank in a case where a temperature of the oil in the double tank type oil pan is equal to or higher than a predetermined temperature.

In this mode, the controller controls the mechanism to connect the inner tank and the outer tank in a case where the temperature of the oil (the oil temperature) is equal to or higher than a predetermined temperature. For example, even if the feedback correction amount is smaller than the first predetermined value, the controller connects the inner tank and the outer tank in a case where the oil temperature is equal to or higher than the predetermined hot temperature. Thus, the heat exchange can be made between the oil in the outer tank, whose temperature is lower than the oil temperature of the inner tank because it is close to the external air, and the high temperature oil in the inner tank. Also, the high temperature oil can be cooled by the heat-exchange with the external air in the outer tank. Therefore, it is possible to appropriately prevent the increase of the oil temperature.

In still another mode of the above control device for an internal combustion engine, the controller starts the control of the mechanism to connect the inner tank and the outer tank in a case where the feedback correction amount is equal to or larger than the first predetermined value, and continues the control of the mechanism until a sum of the feedback correction amount and a learning value corresponding to the feedback correction amount becomes smaller than a second predetermined value.

In this mode, the controller continues the control of the mechanism to connect the inner tank and the outer tank until a sum of the feedback correction amount and a learning value corresponding to the feedback correction amount becomes smaller than a second predetermined value. Since the learning of the air-fuel ratio feedback control being performed to cope with the fuel dilution is reflected to the learning value, it is possible to appropriately determine whether or not the fuel dilution is still occurring by using not only the feedback correction value but also the learning value. Therefore, by continuing the connection between the inner tank and the outer tank until the sum of the feedback correction amount and the learning value becomes smaller than the second predetermined value, it is possible to appropriately prevent the air-fuel ratio from getting rich and it is possible to effectively prevent the erroneous determination of abnormality in the fuel system.

It is noted that "the second predetermined value" is set to a value different from "the first predetermined value", and is set to a value smaller than "the first predetermined value", for example.

DETAILED DESCRIPTION OF THE PREFERRED EMBODIMENTS

Preferred embodiments of the present invention will be explained hereinafter with reference to the drawings.

[Device Configuration]

Figure 1:
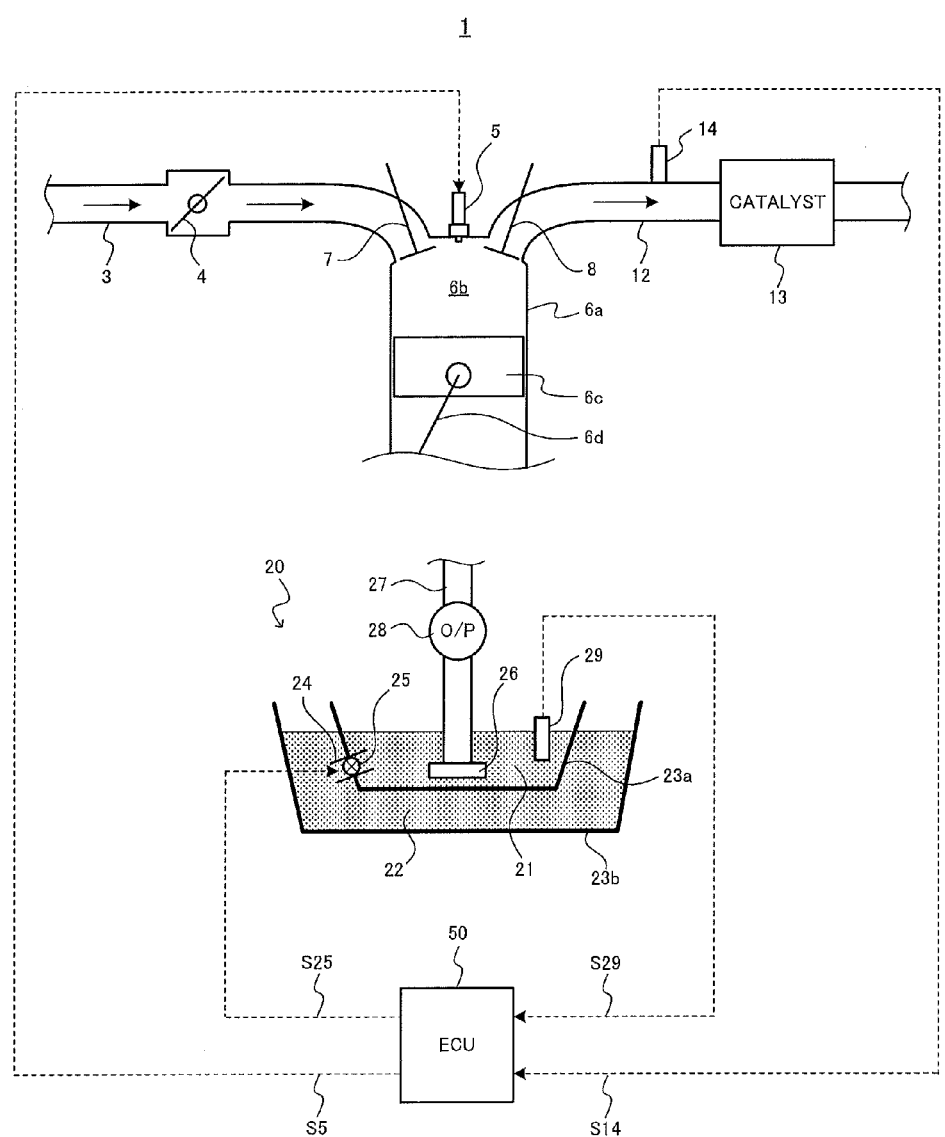
FIG. 1 shows a schematic configuration of an engine according to an embodiment.

FIG. 1 shows a schematic configuration of an engine (an internal combustion engine) 1 according to an embodiment. In FIG. 1, the solid arrow shows a flow of gas, and the broken arrow shows an input/output of a signal.

The engine 1 mainly includes an intake air passage 3, a throttle valve 4, a fuel injection valve, a cylinder 6a, an intake valve 7, an exhaust valve 8, an exhaust passage 12, a catalyst 13 and a double tank type oil pan 20. The engine 1 is controlled by an ECU (Electronic Control Unit) 5. While FIG. 1 shows only one cylinder 6a for convenience of explanation, the engine 1 actually includes plural cylinders 6a.

An intake air (air) introduced from outside flows through the intake passage 3, and the throttle valve 4 adjusts the flow amount of the intake air flowing through the intake passage 3. The air passed through the intake passage 3 is supplied to the combustion chamber 6b. To the combustion chamber 6b, the fuel injected by the fuel injection valve 5 is also supplied. The fuel injection valve 5 is configured to directly inject the fuel into the combustion chamber 6b (Cylinder injection/Direct injection). The fuel injection amount by the fuel injection valve 5 is controlled based on the control signal S5 supplied from the ECU 50.

The combustion chamber 6b is provided with the intake valve 7 and the exhaust valve 8. The connection/disconnection between the intake passage 3 and the combustion chamber 6b is controlled by opening and closing the intake valve 7. The connection/disconnection between the combustion chamber 6b and the exhaust passage 12 is controlled by opening and closing the exhaust valve 8.

In the combustion chamber 6b, the mixture of the intake air and the fuel supplied as described above is combusted. The combustion causes the reciprocal motion of the piston 6c, and the reciprocal motion is transferred to the crank shaft (not shown) via the connecting rod 6d to rotate the crank shaft. The exhaust gas caused by the combustion in the combustion chamber 6b is discharged by the exhaust passage 12.

On the exhaust passage 12, there is provided a catalyst 13 formed to purify the exhaust gas. As the catalyst 13, various known exhaust gas purifying catalyst may be used. At an upstream of the catalyst 13 on the exhaust passage 12, there is provided an air/fuel ratio sensor 14 configured to detect the air-fuel ratio (A/F) of the exhaust gas. The air-fuel ratio sensor 14 supplies the detection signal S14 corresponding to the detected air-fuel ratio to the ECU 50.

The double tank type oil pan 20 is provided at a bottom part of the engine block not shown. The double tank type oil pan 20 is partitioned by the separator 23a to store the oil (engine oil) in two spaces. Specifically, in the double tank type oil pan 20, the space inside the separator 23a forms the inner tank 21, and the space between the separator 23a and the cover 23b forms the outer tank 22. The separator 23a is provided with the communication passage 24 connecting the inner tank 21 and the outer tank 22 to each other. On the communication passage 24, there is provided a valve 25 to switch between the connection and disconnection (separation) of the inner tank 21 and the outer tank 22. The valve 25 is configured by an electromagnetic valve, for example, and its opening and closing is controlled by the control signal S25 supplied from the ECU 50. The valve 25 is an example of the "mechanism" in the present invention, An oil strainer 26 is provided in the inner tank 21, and the oil strainer 26 is connected to the oil passage 27. The oil in the inner tank 21 (including the oil in the outer tank 22 when the inner tank 21 and the outer tank 22 are connected to each other) is sucked out from the suction port of the oil strainer 26 by the oil pump 28 provided on the oil passage 27, and is supplied to various lubricated elements (e.g., gear, cam shaft, piston). In addition, in the inner tank 21, there is provided an oil temperature sensor 29 to detect the temperature of oil (hereinafter, suitably referred to as "oil temperature"). The oil temperature sensor 29 supplies the detection signal S29 corresponding to the detected oil temperature to the ECU 50.

The ECU 50 includes a CPU (Central Processing Unit), a ROM (Read Only Memory) and a RAM (Random Access Memory), which are not shown, and performs various controls for the constitutional elements in the engine 1. In this embodiment, the ECU 50 performs the air-fuel ratio feedback control for adjusting the fuel injection amount by the fuel injection valve 5 so as to set the air-fuel ratio to a target air-fuel ratio based on the air-fuel ratio detected by the air-fuel ratio sensor 14. Further, in this embodiment, the ECU 50 controls the valve 25 to switch between the connection and disconnection of the inner tank 21 and the outer tank 22 based on the result of the air-fuel ratio feedback control (e.g., the feedback correction amount) and the oil temperature detected by the oil temperature sensor 29. While the detail will be described later, the ECU 50 functions as "a controller" in the present invention.

[Air-Fuel Ratio Feedback Control]

Next, the air-fuel ratio feedback control mentioned above will be described. As the air-fuel feedback control, various known control may be applied in the present invention. Therefore, the air-fuel ratio feedback control will be briefly described below.

The ECU 50 performs the air-fuel ratio feedback control to adjust the fuel injection amount from the fuel injection valve 5 so as to set the air-fuel ratio to the target air-fuel ratio based on the air-fuel ratio detected by the air-fuel ratio sensor 14. In this case, the ECU 50 calculates the feedback correction amount of the fuel injection amount based on the air-fuel ratio detected by the air-fuel ratio sensor 14, and calculates the learning value of the feedback correction amount if a predetermined learning condition is satisfied.

The feedback correction amount corresponds to a value of deviation between the fuel injection amount to be set to make the air-fuel ratio to be equal to the target air-fuel ratio and the fuel injection amount actually being injected. For example, the feedback correction amount is represented by the unit of "%". The feedback correction amount is calculated to increase when the air-fuel ratio is lean (leaner than the target air-fuel ratio), and is calculated to decrease when the air-fuel ratio is rich (richer than the target air-fuel ratio).

The learning value indicates a constant deviation amount of the fuel injection amount, and is calculated based on the feedback correction amount. For example, the learning value is represented by the unit of "%". Specifically, when the predetermined learning condition is satisfied, the learning value is calculated by adding or subtracting an updating amount determined based on a map to or from the learning value previously calculated. For example, the predetermined condition is that the average value (the control center value) of the feedback correction amount is smaller than a threshold value A or larger than a threshold value B (value B>value A). As the fuel injection value is more excessive (i.e., as the actual fuel injection amount is larger than the target fuel injection amount), a smaller learning value is calculated. As the fuel injection value is shorter (i.e., as the actual fuel injection amount is smaller than the target fuel injection amount), a larger learning value is calculated.

It is noted that other various known methods may be used as the calculation method of the feedback correction amount and the calculation method of the learning value.

The fuel injection amount is corrected based on the feedback correction amount and the learning value obtained as described above. Basically, the correction amount of the fuel injection amount is calculated as a sum of the feedback correction amount and the learning value. Thus, as the feedback correction amount and/or the learning amount is larger, the correction is made to increase the fuel injection amount. As the feedback correction amount and/or the fuel injection amount is smaller, the correction is made to decrease the fuel injection amount.

By the way, the ECU 50 uses the feedback correction amount described above in the abnormality determination of the fuel system (e.g., the path for supplying the fuel to the cylinder 6a and various constitutional elements existing around the cylinder 6a). Specifically, the ECU 50 determines that the abnormality occurs to the fuel system in the case where the absolute value of the feedback correction amount is equal to or larger than the threshold, e.g., the absolute value of the feedback correction amount is equal to or larger than "±40%". This abnormality includes "rich abnormality" in which the actual fuel injection amount is much larger than the target fuel injection amount, and "lean abnormality" in which the actual fuel injection amount is much smaller than the target fuel injection amount.

Control Method in Embodiment

Next, the control method performed by the ECU 50 in the embodiment will be specifically described.

First, the description will be given of a problem to be solved by the control method of the embodiment. For example, as a problem of the engine performing the cylinder injection, there is known "fuel dilution" in which the fuel mixes in the oil. The fuel dilution may occur in such a manner that the fuel injected into the cylinder adheres to the cylinder bore while the engine is cold, and is scraped off into the oil pan together with the oil by the piston ring. When the fuel dilution occurs, the lubrication performance of the oil may be influenced. Also, if the oil temperature exceeds the boiling point of the fuel, the fuel mixed in the oil may volatilize to be recirculated to the intake system via the PCV valve. Therefore, if the dilution amount of the fuel is large, the air-fuel ratio may become considerably rich. In that case, since the feedback correction amount of the air-fuel ratio feedback control becomes large (i.e., the degree of correcting the fuel injection amount by the air-fuel feedback control becomes large), the abnormality determination performed based on the feedback correction amount may erroneously determines that abnormality occurs in the fuel system.

Therefore, in this embodiment, in order to prevent the erroneous determination of abnormality in the fuel system as described above, the ECU 50 controls the valve 25 to connect the inner tank 21 and the outer tank 22 of the double tank type oil pan 20 when the fuel dilution is occurring. By connecting the inner tank 21 and the outer tank 22, in comparison with the case where only the inner tank 21 is used, the amount of oil being used increases, and the dilution ratio defined by "Fuel amount/Oil amount" can be lowered. Namely, the fuel in the oil is diluted. Thus, it is possible to reduce the amount of the fuel mixed in the oil, volatilized and then recirculated to the intake system, and it is possible to prevent the air-fuel ratio from becoming rich. As a result, the feedback correction amount (absolute value) in the air-fuel ratio feedback control is lowered, and the feedback correction amount (absolute value) can be apart from the threshold value for the abnormality determination of the fuel system. Thus, it is possible to prevent the erroneous determination that abnormality occurs in the fuel system.

The control method in this embodiment will be specifically described. In this embodiment, the ECU 50 determines whether it is the situation where the fuel dilution amount is large (including the situation where it is highly possible that the fuel dilution amount becomes large) or not, based on the feedback correction amount of the air-fuel ratio feedback control, and controls the connection between the inner tank 21 and the outer tank 22 in accordance with the determination result. Namely, the ECU 50 determines that it is the situation where the fuel dilution amount is large when the feedback correction amount is equal to or larger than a predetermined value (hereinafter referred to as "first predetermined value"), and connects the inner tank 21 and the outer tank 22 to each other. The reason thereof is as follows. When the dilution amount of the fuel is large, the air-fuel ratio becomes rich due to the fuel mixed in the oil as described above and accordingly the feedback correction amount becomes large. Therefore, it is possible to judge whether the dilution amount is large or small based on the feedback correction amount. The "first predetermined value" is set to the feedback correction amount corresponding to the dilution amount for which the countermeasure such as the connection between the inner tank 21 and the outer tank 22 should be taken.

In this embodiment, the ECU 50 starts the control of connecting the inner tank 21 and the outer tank 22 as described above when the feedback correction amount is equal to or larger than the first predetermined value, and continues the control until the sum of the feedback correction amount and the learning value becomes smaller than a predetermined value (hereinafter referred to as a "second predetermined value"). This is because, even if the feedback correction amount is reduced to be smaller than the first predetermined value, when the learning value updated in accordance with the feedback correction amount is a value of certain degree, it is conceivable that the fuel dilution is still occurring. Namely, when the inner tank 21 and the outer tank 22 are connected to each other, the learning of the air-fuel ratio feedback control advances and the feedback correction amount decreases. However, in a situation where the learning of the air-fuel ratio feedback control is still in progress (in this situation, the learning value becomes a value of certain degree), it is conceivable that the fuel dilution is still occurring. The "second predetermined value" is set to the value corresponding to the dilution amount for which the countermeasure such as the connection between the inner tank 21 and the outer tank 22 should be taken. In one example, the "second predetermined value" is set to be smaller than the "first predetermined value".

Further, in this embodiment, the ECU 50 connects the inner tank 21 and the outer tank 22 to each other in a case where the oil temperature in the inner tank 21 is higher than a predetermined temperature. For example, even if the above-described condition of connecting the inner tank 21 and the outer tank 22 is not satisfied, i.e., if it is not the situation to cope with the fuel dilution, if the oil temperature in the inner tank 21 is equal to or higher than 100 degrees Celsius, the ECU 50 performs the control of connecting the inner tank 21 and the outer tank 22. By this, it is possible to heat-exchange the oil in the outer tank 22, having lower temperature than the oil temperature of the inner tank 21 because it is close to the external air, with the high temperature oil in the inner tank 21. In addition, it is possible to cool the high temperature oil by the heat-exchange with the external air in the outer tank 22. Therefore, it is possible to appropriately prevent the temperature increase of the oil. As a result, it is possible to realize both the improvement of warming the oil by only using the inner tank 21 and cooling the oil, and it is possible to appropriately realize the improvement of the fuel consumption and the suppression of the lubrication performance deterioration.

Process Flow of Embodiment

Figure 2:
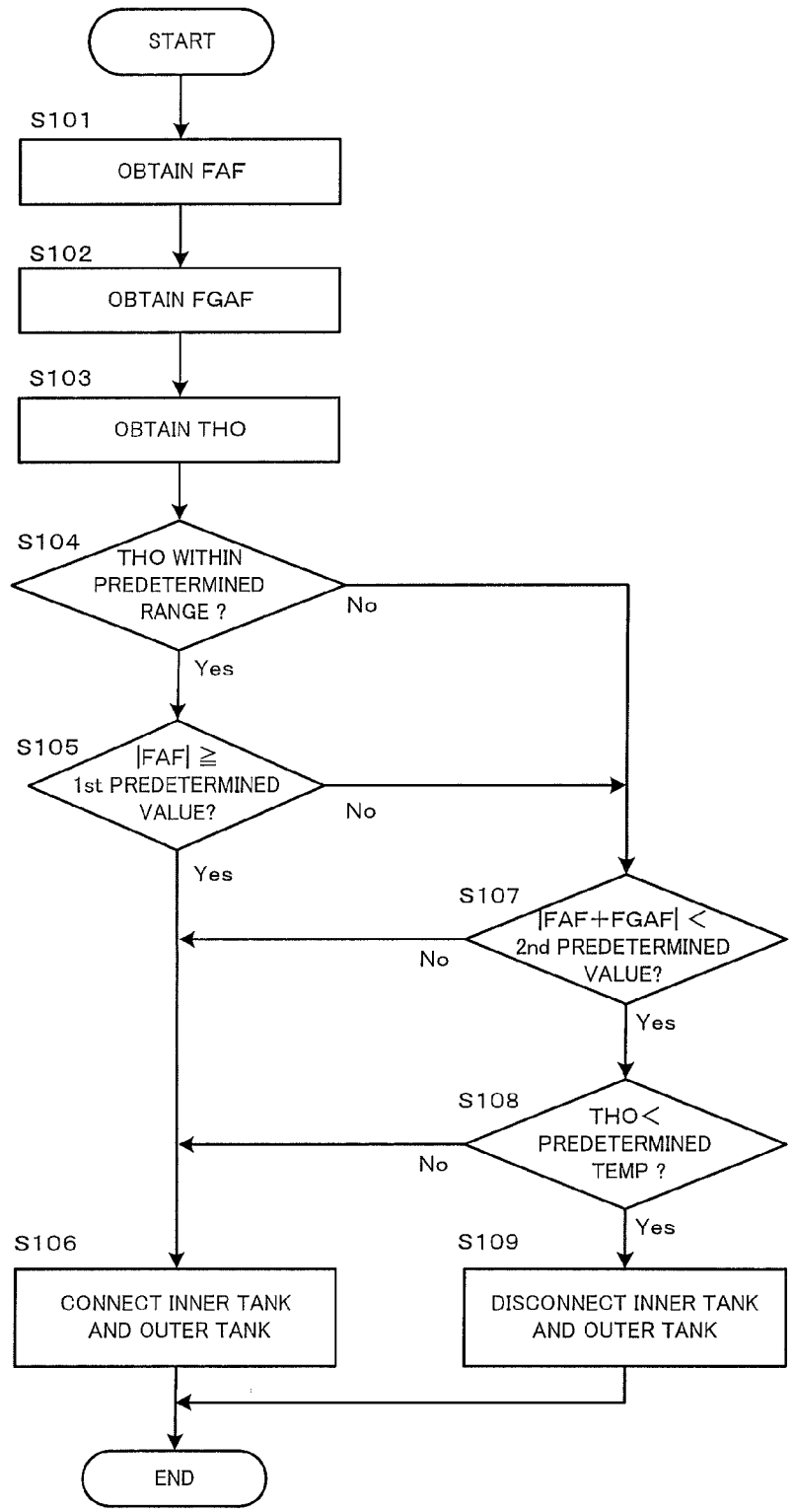
FIG. 2 shows a process flow according to the embodiment.

Next, with reference to FIG. 2, the description will be given of an example of a process flow to which the control method of the embodiment is applied. FIG. 2 shows the process flow of the embodiment. This flow is repeatedly executed at a predetermined cycle by the ECU 50.

First, the ECU 50 obtains the feedback correction amount (hereinafter referred to as "FAF") in the air-fuel ratio feedback control in step S101, and obtains the learning value (hereinafter referred to as "FGAF") in the air-fuel feedback control in step S102. Then, in step S103, the ECU 50 obtains the oil temperature (hereinafter referred to as "THO"). Then, the process goes to step S104.

In step D104, the ECU 50 determines whether or not the oil temperature THO obtained in step S103 is within a predetermined range. Here, based on the oil temperature THO, the ECU 50 determines whether or not it is the situation where the fuel mixed in the oil is volatilized and whether or not it is the situation where the updating of the learning value FGAF in the air-fuel ratio feedback control is not being executed (i.e., the situation where the learning is not being executed in the air-fuel ratio feedback control). For example, the predetermined range used in the determination step S104 is set such that the temperature corresponding to the oil temperature at which the fuel is volatilized is set to its lower limit value and the temperature corresponding to the oil temperature at which the updating of the learning value FGAF is started is set to its upper limit value. In one example, the predetermined range is set to the range from 40 degrees Celsius to 80 degrees Celsius.

As described above, the reason of determining whether or not it is the situation where the fuel mixed in the oil is volatilized is to determine whether or not the present situation is the situation where the erroneous determination of abnormality of the fuel system by the rich air-fuel ratio due to the volatilization of the diluted fuel should be prevented. The reason of determining whether or not it is the situation where the updating of the learning value FGAF is not being executed is to determine whether or not the dilution amount is increased at the current trip from the last trip by using, in the following process, the feedback correction amount FAF for which the updating of the learning value FGAF is not performed in the current trip. In the current trip, the air-fuel ratio feedback is started with the feedback correction amount FAF to which the learning value FGAF in the last trip is applied, and therefore the feedback correction amount FAF at that time is basically a very small value. However, when the dilution amount increases from the current trip, the feedback correction amount FAF becomes large. Therefore, by referring to the feedback correction amount FAF at the time when the learning value FGAF is not updated in the current trip, it is possible to appropriately determine whether or not the dilution amount is increased from the current trip.

When the oil temperature is within the predetermined range (step S104: Yes), the process goes to step S105. In step S105, the ECU 50 determines whether or not the absolute value of the feedback correction amount FAF is equal to or larger than the first predetermined value. The situation of step S105 is that the fuel mixed in the oil may be volatilized and the learning value FGAF in the air-fuel ratio feedback control is not updated. Therefore, in step S105, based on the feedback correction amount FAF, the ECU 50 determines whether or not it is the situation where the dilution amount of the fuel is large. Namely, based on the feedback correction amount FAF at the time when the learning value FGAF is not updated at the current trip, the ECU 50 determines whether or not the dilution amount is increased from the current trip. In one example, the first predetermined value used in the determination is set to "15%".

When the absolute value of the feedback correction amount FAF is equal to or larger than the first predetermined value (step S105: Yes), the process goes to step S106. In this case, it is the situation where the fuel dilution amount is large. Therefore, the ECU 50 controls the valve 25 to be opened to connect the inner tank 21 and the outer tank 22 (step S106). Namely, the ECU 50 lowers the dilution ratio (Fuel amount/Oil amount) to make the feedback correction amount FAF apart from the threshold value of the abnormality determination, and connects the inner tank 21 and the outer tank 22 to prevent the erroneous determination of the abnormality of the fuel system. Then, the process ends.

On the other hand, when the oil temperature THO is not within the predetermined range (step S104: No) and when the absolute value of the feedback correction amount FAF is smaller than the first predetermined value (step S105: No), the process goes to step S107. In step S107, the ECU 50 determines whether or not the absolute value of the sum of the feedback correction amount FAF and the learning value FGAF is smaller than the second predetermined value. Here, the ECU 50 determines whether or not the fuel dilution is still occurring. Since the process in step S107 is performed when the learning value FGAF is updated in the current trip (step S104: No) and when the absolute value of the feedback correction amount FAF is lowered to be smaller than the first predetermined value (step S105: No), the ECU 50 performs the determination by using not only the feedback correction amount FAF but also the learning value FGAF to appropriately cope with those cases.

Even in the situation where the feedback correction amount FAF is lowered to a certain degree by the control of connecting the inner tank 21 and the outer tank 22 and it is determined that the dilution amount is small, by using the learning value FGAF together, it is possible to appropriately determine that the fuel dilution to be coped with is still occurring. Namely, if the learning progresses, it becomes difficult to determine the fuel dilution from the feedback correction amount FAF. However, since the fact that the learning of the air-fuel ratio feedback control to cope with the fuel dilution is currently progressing is reflected to the learning value FGAF, based on the learning value FGAF, it is possible to appropriately determine whether or not the fuel dilution is still occurring.

For example, the second predetermined value used in the determination in step S107 is set to be a value smaller than the first predetermined value used in the determination in step S105. In one example, the second predetermined value used in the determination is set to "10%".

When the absolute value of the sum of the feedback correction value FAF and the learning value FGAF is equal to or larger than the second predetermined value (step S107: No), the process goes to step S106. In this case, it is the situation where the fuel dilution is still occurring. Therefore, in order to prevent the erroneous determination of the abnormality of the fuel system, the ECU 50 controls the valve 25 to be opened to connect the inner tank 21 and the outer tank 22 (step S106). Then, the process ends.

On the other hand, when the absolute value of the sum of the feedback correction amount FAF and the learning value FGAF is smaller than the second predetermined value (step S107: Yes), the process goes to step S108. In step S108, the ECU 50 determines whether or not the oil temperature THO is lower than the predetermined temperature. Here, the ECU 50 determines whether or not the oil temperature is high. In one example, the predetermined temperature used in the determination is set to 100 degrees Celsius.

When the oil temperature THO is equal to or higher than the predetermined temperature (step S108: No), the process goes to step S106. In this case, in order to lower the oil temperature THO, i.e., in order to prevent the increase of the oil temperature, the ECU 50 controls the valve 25 to be opened to connect the inner tank 21 and the outer tank 22 (step S106). Then, the process ends.

On the other hand, when the oil temperature THO is lower than the predetermined temperature (step S108: Yes), the process goes to step S109. In this case, since it is not necessary to cope with the fuel dilution or the increase of the oil temperature, the ECU 50 controls the valve 25 to be closed to disconnect (separate) the inner tank 21 and the outer tank 22 (step S109). Then, the process ends.

According to the process flow described above, it is possible to appropriately prevent the erroneous determination of the abnormality of the fuel system caused by the fuel dilution, and it is also possible to appropriately suppress the increase of the oil temperature.

Modified Example

While FIG. 1 shows the engine 1 of cylinder injection type, the application of the present invention is not limited to the engine of cylinder injection type. The present invention is applicable to an engine of port injection type.

While the above description shows an example in which the air-fuel ratio feedback control is performed based on the output of the air-fuel ratio sensor 14 provided on the exhaust passage 12 at an upstream side of the catalyst 13, the application of the present invention is not limited to this. In another example, the air-fuel ratio feedback control may be performed based on the output of the air-fuel ratio sensor provided on the exhaust passage 12 at a downstream side of the catalyst 13, instead of or in addition to the air-fuel ratio sensor 14. Further, in still another example, the air-fuel ratio feedback control may be performed based on the output of an oxygen concentration sensor, instead of the air-fuel ratio sensor.

In the process flow shown in FIG. 2, the inner tank 21 and the outer tank 22 are connected to each other when the oil temperature THO is within the predetermined range (step S104: Yes) and the absolute value of the feedback correction amount FAF is equal to or larger than the first predetermined value (step S105: Yes). In another example, regardless of the oil temperature THO, the inner tank 21 and the outer tank 22 may be connected to each other when the absolute value of the feedback correction amount FAF is equal to or larger than the first predetermined value.

In the process flow shown in FIG. 2, when the absolute value of the feedback correction amount FAF is smaller than the first predetermined value (step S105: No), the inner tank 21 and the outer tank 22 are disconnected in accordance with the results of the determination (step S107) whether or not the absolute value of the sum of the feedback correction amount FAF and the learning value FGAF is smaller than the second predetermined value and the determination (step S108) whether or not the oil temperature is smaller than the predetermined temperature. In another example, the inner tank 21 and the outer tank 22 may be disconnected when the absolute value of the feedback correction amount FAF is smaller than the first predetermined value, without performing the determinations in steps S107 and S108.

Further, in the process flow shown in FIG. 2, the inner tank 21 and the outer tank 22 are disconnected when the absolute value of the sum of the feedback correction amount FAF and the learning value FGAF is smaller than the second predetermined value (step S107: Yes) and the oil temperature THO is lower than the predetermined temperature (step S108: Yes). In another example, regardless of the oil temperature THO, the inner tank 21 and the outer tank 22 may be disconnected when the absolute value of the sum of the feedback correction amount FAF and the learning value FGAF is smaller than the second predetermined value.

As described above, the embodiment is not limited to those described above, and may be appropriately alterable without being contrary to the gist or idea of the invention readable from claims and entire specification.

INDUSTRIAL APPLICABILITY

This invention is suitably applicable to an engine having a double tank type oil pan.

DESCRIPTION OF REFERENCE NUMBERS

1 Engine
3 Intake Passage
5 Fuel Injection Valve
6a Cylinder
12 Exhaust Passage
13 Catalyst
14 Air-Fuel Ratio Sensor
20 Double Tank Type Oil Pan
21 Inner tank
22 Outer tank
24 Communication Passage
25 Valve
29 Oil Temperature Sensor
50 ECU

The invention claimed is:

1. A control device for an internal combustion engine, which performs air-fuel ratio feedback control to set an air-fuel ratio to a target air-fuel ratio, and which determines abnormality of a fuel system based on a feedback correction amount by the air-fuel ratio feedback control, comprising:

a double tank type oil pan including: an inner tank and an outer tank for storing oil; and a mechanism which switches between connection and disconnection of the inner tank and the outer tank; and a controller configured to control the mechanism to connect the inner tank and the outer tank in a case where the feedback correction amount is equal to or larger than a first predetermined value.

2. The control device for an internal combustion engine according to claim 1, wherein the controller connects the inner tank and the outer tank in a case where a dilution amount indicating a fuel amount mixed in the oil in a current trip is larger than a dilution amount in a last trip preceding a starting time of the internal combustion engine of the current trip, if the feedback correction amount is equal to or larger than the first predetermined value.

3. The control device for an internal combustion engine according to claim 1, wherein the controller decreases a dilution ratio, which is a ratio of fuel mixed in the oil to an amount of the oil, by connecting the inner tank and the outer tank.

4. The control device for an internal combustion engine according to claim 1, wherein the controller controls the mechanism to connect the inner tank and the outer tank in a case where a temperature of the oil in the double tank type oil pan is equal to or higher than a predetermined temperature.

5. The control device for an internal combustion engine according to claim 1, wherein the controller starts the control of the mechanism to connect the inner tank and the outer tank in a case where the feedback correction amount is equal to or larger than the first predetermined value, and continues the control of the mechanism until a sum of the feedback correction amount and a learning value corresponding to the feedback correction amount becomes smaller than a second predetermined value.

* * * * *